US009537787B2

(12) United States Patent
Bachar et al.

(10) Patent No.: US 9,537,787 B2
(45) Date of Patent: Jan. 3, 2017

(54) DYNAMICALLY BALANCING RESOURCE REQUIREMENTS FOR CLIENTS WITH UNPREDICTABLE LOADS

(71) Applicant: INTERNATIONAL BUSINESS MACHINES CORPORATION, Armonk, NY (US)

(72) Inventors: Yariv Bachar, Kibbutz Ma'abarot (IL); Ron Edelstein, Tel Aviv (IL); Alon Horowitz, Tel-Aviv (IL); Oded Sonin, Omer (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 523 days.

(21) Appl. No.: 13/958,849

(22) Filed: Aug. 5, 2013

(65) Prior Publication Data
US 2015/0039766 A1    Feb. 5, 2015

(51) Int. Cl.
*G06F 15/173* (2006.01)
*H04L 12/911* (2013.01)
*G06F 9/50* (2006.01)
*H04L 29/08* (2006.01)

(52) U.S. Cl.
CPC .............. *H04L 47/70* (2013.01); *G06F 9/50* (2013.01); *G06F 9/505* (2013.01); *H04L 67/10* (2013.01); *G06F 2209/504* (2013.01); *Y02B 60/142* (2013.01)

(58) Field of Classification Search
None
See application file for complete search history.

(56) References Cited

U.S. PATENT DOCUMENTS

| 7,376,738 | B2  |    | 5/2008  | Snyder |
| 8,046,763 | B1  |    | 10/2011 | Czajkowski et al. |
| 8,260,917 | B1  | *  | 9/2012  | Manikowski ........... G06F 9/505 709/203 |
| 8,392,564 | B1  |    | 3/2013  | Czajkowski et al. |
| 8,914,497 | B1  | *  | 12/2014 | Xiao ....................... H04L 67/16 370/235 |
| 2003/0046396 | A1 | * | 3/2003 | Richter ................... G06F 9/505 709/226 |

(Continued)

OTHER PUBLICATIONS

"Adaptive Overload Control for Busy Internet Servers"; Welsh et. al; 2003.*

*Primary Examiner* — June Sison
(74) *Attorney, Agent, or Firm* — Griffiths & Seaton PLLC

(57) ABSTRACT

In one embodiment, by way of example only, a resource threshold limits the resource usage of each of the multiplicity of clients. The resource threshold of each of the multiplicity of clients increases over time and decreases when the resources deplete and a resource request of a client is rejected. A subset of clients is created from the multiplicity of clients having a resource usage greater than the resource usage of the rejected client. A dynamic average of a normalized number of resources is calculated from the subset of clients. The resource threshold of each client from the subset of clients is decreased based on the dynamic average of the subset of clients, and further acquisition of resources is restricted from each client from the subset of clients in order to bring the resource usage of each of the subset of clients under the resource threshold.

18 Claims, 8 Drawing Sheets

(56) References Cited

U.S. PATENT DOCUMENTS

| | | | |
|---|---|---|---|
| 2005/0055694 A1* | 3/2005 | Lee | G06F 9/5083 |
| | | | 718/100 |
| 2006/0069716 A1* | 3/2006 | Fleiner | H04L 67/1095 |
| | | | 709/203 |
| 2006/0212581 A1* | 9/2006 | Coar | H04L 67/02 |
| | | | 709/227 |
| 2007/0038738 A1* | 2/2007 | Iyengar | G06F 11/3466 |
| | | | 709/224 |
| 2008/0008094 A1* | 1/2008 | Gilfix | H04L 67/125 |
| | | | 370/235 |
| 2008/0183865 A1* | 7/2008 | Appleby | H04L 67/1008 |
| | | | 709/224 |
| 2009/0037700 A1* | 2/2009 | Graham | G06F 9/54 |
| | | | 712/220 |
| 2010/0274893 A1* | 10/2010 | Abdelal | H04L 29/0602 |
| | | | 709/224 |
| 2011/0167112 A1* | 7/2011 | Mazzucco | G06F 9/505 |
| | | | 709/203 |
| 2012/0311598 A1 | 12/2012 | Bachar et al. | |

* cited by examiner

DYNAMICALLY BALANCING RESOURCE REQUIREMENTS FOR CLIENTS WITH UNPREDICTABLE LOADS

BACKGROUND OF THE INVENTION

1. Field of the Invention

The present invention relates in general to computers, and more particularly to dynamically balancing resource resources according to a client's requirement for a multiplicity of clients with unpredictable loads based on a prior resource usage (e.g., resource usage history) by a processor device in a computing environment.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components.

Within the computing environment, system resources may be required to perform a variety of operations and services. Systems that maintain simultaneously running activities by multiple clients are often constrained by their dependency on resources that may only be used by one activity at a time. The challenge in such systems is to distribute a limited number of resources between the multiple clients, while considering the resource availability and the multiple clients' need and priority.

SUMMARY OF THE DESCRIBED EMBODIMENTS

In one embodiment, a method is provided for dynamically balancing resource resources according to a client's requirement for a multiplicity of clients with unpredictable loads based on a prior resource usage (e.g., resource usage history) using at least one processor device in a computing environment. In one embodiment, by way of example only, a resource threshold limits the resource usage of each of the multiplicity of clients. The resource threshold of each of the multiplicity of clients increases over time and decreases when the resources deplete and a resource request of a client is rejected. A subset of clients is created from the multiplicity of clients having a resource usage greater than the resource usage of the rejected client. A dynamic average of a normalized number of resources is calculated from the subset of clients. The resource threshold of each client from the subset of clients is decreased based on the dynamic average of the subset of clients, and further acquisition of resources is restricted from each client from the subset of clients in order to bring the resource usage of each of the subset of clients under the resource threshold.

In another embodiment, a computer system is provided for dynamically balancing resource resources according to a client's requirement for a multiplicity of clients with unpredictable loads based on a prior resource usage (e.g., resource usage history) using at least one processor device, in a computing environment. The computer system includes a computer-readable medium and a processor in operable communication with the computer-readable medium. In one embodiment, by way of example only, the processor, using a resource threshold, limits the resource usage of each of the multiplicity of clients. The resource threshold of each of the multiplicity of clients increases over time and decreases when the resources deplete and a resource request of a client is rejected. A subset of clients is created from the multiplicity of clients having a resource usage greater than the resource usage of the rejected client. A dynamic average of a normalized number of resources is calculated from the subset of clients. The resource threshold of each client from the subset of clients is decreased based on the dynamic average of the subset of clients, and further acquisition of resources is restricted from each client from the subset of clients in order to bring the resource usage of each of the subset of clients under the resource threshold.

In a further embodiment, a computer program product is provided for dynamically balancing resource resources according to a client's requirement for a multiplicity of clients with unpredictable loads based on a prior resource usage (e.g., resource usage history) using at least one processor device, in a computing environment. The computer-readable storage medium has computer-readable program code portions stored thereon. The computer-readable program code portions include executable portions that use a resource threshold to limit the resource usage of each of the multiplicity of clients. The resource threshold of each of the multiplicity of clients increases over time and decreases when the resources deplete and a resource request of a client is rejected. A subset of clients is created from the multiplicity of clients having a resource usage greater than the resource usage of the rejected client. A dynamic average of a normalized number of resources is calculated from the subset of clients. The resource threshold of each client from the subset of clients is decreased based on the dynamic average of the subset of clients, and further acquisition of resources is restricted from each client from the subset of clients in order to bring the resource usage of each of the subset of clients under the resource threshold.

In addition to the foregoing exemplary method embodiment, other exemplary system and computer product embodiments are provided and contribute related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
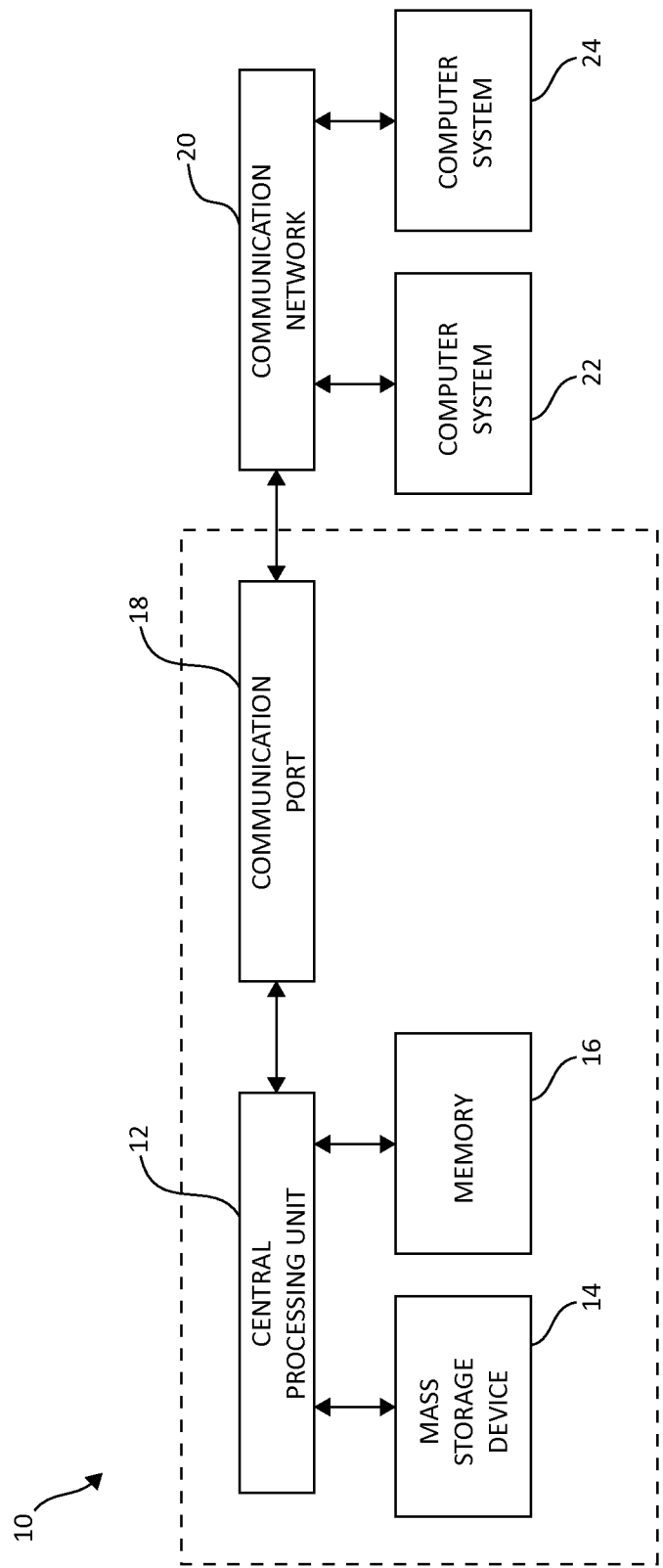
FIG. 1 illustrates a computer storage environment having an example storage device in which aspects of the present invention may be realized.

Throughout the following description and claimed subject matter, the following terminology, pertaining to the illustrated embodiments, is described. The definitions may form a table of suitable of definitions, form various representations of mathematical equations for suitable purposes if needed, form matrices for suitable purposes if needed, and for certain terms used herein.

A "Total Resources" ("TotalResources") is intended herein to include the total number of resources that are available for the clients.

A "Weight" is intended herein to include the predefined number that is assigned to each client and represents the priority the client should have with relation to resource allocation. Clients with a greater weight will have precedence over clients with a lesser weight.

A "Current Resource Usage" (per client) is intended herein to include the current number of resources that are allocated to and/or taken by each client.

A "normalization function (e.g., $\Omega_i(x)$)" is intended herein to be a normalization function per client that normalizes the current resource usage of its corresponding client according to its weight.

A "Static Average" (per client) is intended herein to include a normalized current resource usage each client should have, in order to achieve an ideal load balance. In one embodiment, an ideal load balance is when all the available resources are distributed and each client is gets a share of the resources according to the client's weight. The normalized number of resources of each client will be calculated using each client's corresponding normalization function. For example, if there are 2 clients with client 1 being assigned $weight_1=1$ and client 2 being assigned $weight_2=2$, and TotalResources=6 then the StaticAverage=6 since the ideal balance will be achieved when $CurrentResourceUsage_1=2$ and $CurrentResourceUsage_2=4$ and after normalization of the clients' current resource usage $\Omega_1(2)=\Omega_2(4)=6$. It is calculated according to the formula as depicted the following equation:

$$StaticAverage = TotalResources * LCM(Weight_i, \ldots, Weight_N) \quad (1),$$

Where LCM is a least common multiple and the Weight is a assigned to each client.

A "Dynamic Average" is intended herein to include the normalized number of resources each client from a selected set of clients should have in order to achieve an ideal balance of the resources allocated by the clients in the selected set. For example, if there are 3 clients, $weight_1=weight_2=weight_3=1$, TotalResources=7, $CurrentResourceUsage_1=1$, $CurrentResourceUsage_2=2$, and $CurrentResourceUsage_3=4$, then DynamicAverage=3 of client 2 and 3.

An "Threshold" (e.g., resource threshold) (per client) is intended herein to include the maximum normalized number of resources that a client can acquire. Each client has its own threshold and no threshold is lower than the static average.

A "Feedback Control Algorithm" (FCA) is intended herein to include the algorithm that utilizes the behavior of a system to change its operation in order to constantly reduce the difference between the output and a target value.

An "Additive Increase/Multiplicative Decrease" (AIMD) is intended herein to include the feedback control algorithm (FCA) that is used in transmission control protocol (TCP) congestion avoidance. It combines linear growth of the congestion window with an exponential reduction when congestion takes place, and thus constitutes an example to a feedback control algorithm that maintains the required FCA properties. An adaptation of this algorithm may be used, only by way of example, to describe the implementation of controlling the resources.

An "Increase Rate Factor" is intended herein to include a positive non-zero rational number that affects the rate of the Additive Increase.

A "Decrease Rate Factor" is intended herein to include a rational number between zero and one that affect the rate of the Multiplicative Decrease.

A "Update Latency" is intended herein to include a time interval per client that passed since the last time the client's threshold (e.g., resource threshold) was updated. This is used in the calculation of the current threshold of a given client.

A "Active Time Period" is intended herein to include a time interval that must pass since last resource request by a client in order for it to be considered inactive.

In one embodiment, dynamic resource balancing is a procedure of distributing a limited number of resources among clients, while considering the resource availability vis-à-vis the clients' constraints. A client that requires a resource issues a request to the resource load balancer and the load balancer decides whether to accept or reject the request. In case the demand for the system's resources is greater than the number of available resources, one may choose either static or dynamic resource distribution. In static resource distribution, the system's resources are statically divided among the clients, and share per client is fixed throughout the system's lifetime. Subsequently, a request, issued by a client for resources, will only be accepted if the resource-share that is assigned to that client has not been fully utilized. Although this approach is easier to implement, it may be less efficient and wasteful in certain systems, e.g. where one client is not using its share of resources at all while another is constantly capped at its resource boundary.

In one embodiment for dynamic resource distribution, the resource-share per client is determined during run-time, according to resource demand. In this manner, clients that require a large amount of resources are favored over clients that require a small amount of resources. Should the demand for requirements change, the dynamic resource distribution mechanism will need to adapt the resource-share per client during runtime. The resource load balancing mechanism presented here is such dynamic resource distribution mechanism. The resource load balancing mechanism may utilize pending (i.e. not yet issued) resource requests in order to optimize the resource allocation scheme. For instance, if one client has twice as many pending requests than the other, the mechanism may decide to reject some of the requests of the lower-demanding client in order to prepare for the high amount of requests that are expected to be issued from the other client. While this approach allows a certain amount of optimization to the resource load balancer, it requires the clients to share their pending requests with the load balancing mechanism. This is not always practical (e.g., when the requests arrive via a network link with only enough bandwidth for the requests themselves). In these cases, resource allocation requests are made available to the resource allocation mechanism only once they are issued.

Thus, the mechanisms of the present invention will satisfy the following essential requirements for dynamically balancing resource requirements for a multiplicity of clients with unpredictable loads using a load balancer: (1) allocate resources according to predefined weights per client, for which clients with higher weights will be assigned a higher resource share than clients with lower weights (e.g., the greater the weight assigned to a client, the greater the resources share size a client will have), (2) adjust to changes in resource requests and dynamically assign more resources to a client with higher demand at the expense of a client that is not currently using its entire resource share, (3) avoid starvation of a less-clients (i.e., even though a client demands lesser resources than other clients, it will receive resources and will not be starved), (4) operate in unpredictable load (i.e., unaware of pending resource requests). The resource allocation scheme depends solely on resource requests already issued and not on pending future requests, (5) support multiple clients, and 6) dynamically adjust to changes in the total number of resources available for distribution. Thus, present invention provides for resource load balancing, satisfying all requirements of these 6 requirements. In one embodiment, the present invention enables weighted (prioritized), dynamic resource distribution under unpredictable load for unlimited number of clients. These six factors are further demonstrated below in FIG. 3 and other FIG.'s below, and are referenced herein as the "requirements" and/or "factors."

In one embodiment, as described herein, the present invention provides for dynamically balancing resource requirement for a multiplicity of clients with unpredictable loads based on an average of resource usage using at least one processor device in a computing environment. In one embodiment, by way of example only, a subset of clients are created from the multiplicity of clients having a resource usage more than one of the multiplicity of clients whose resource request has been rejected. A dynamic average of a normalized number of resources is calculated for each of the subset of clients, for load balancing by a load balancer, of the resources allocated to the subset of clients. A resource threshold is dynamically determined based on the resource usage of each of the multiplicity of clients. The resource threshold is decreased based on the dynamic average for each the subset of clients from the multiplicity of clients, and further acquisition of the resources is restricted from each of the subset of clients in order to bring the resource usage of each of the subset of clients under the resource threshold.

Thus, the present invention, uses a load balancer that balances a set of resources among several clients while taking into account the consumption of resources by other clients. Each client is throttled independently with disregard for the other clients. In one embodiment, the load balancer doesn't know how many resources each client wants, requires, and/or needs. Rather, the load balancer dynamically adjusts itself according to client's resource requests and provides as many resources as possible to each client without going out of balance. In one embodiment, the load balancer does not require predefined thresholds, but does take into account the overall balance of resources. In one embodiment, the load balancer tries to use and/or provide as many resources as possible (from a predefined number of available resources to balance). In one embodiment, the load balancer optimizing resource consumption.

Turning now to FIG. 1, exemplary architecture 10 of data storage systems (e.g., virtual tape systems) for resource allocation of resources for dual activities systems in a computing environment is depicted. The computer system 10 includes central processing unit (CPU) 12, which is connected to mass storage device(s) 14 and memory device 16. Mass storage devices may include hard disk drive (HDD) devices, solid-state devices (SSD) etc., which may be configured in a redundant array of independent disks (RAID). The backup operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 may be connected through communication port 18 to a communication network 20, having an attached plurality of additional computer systems 22 and 24.

Figure 2:
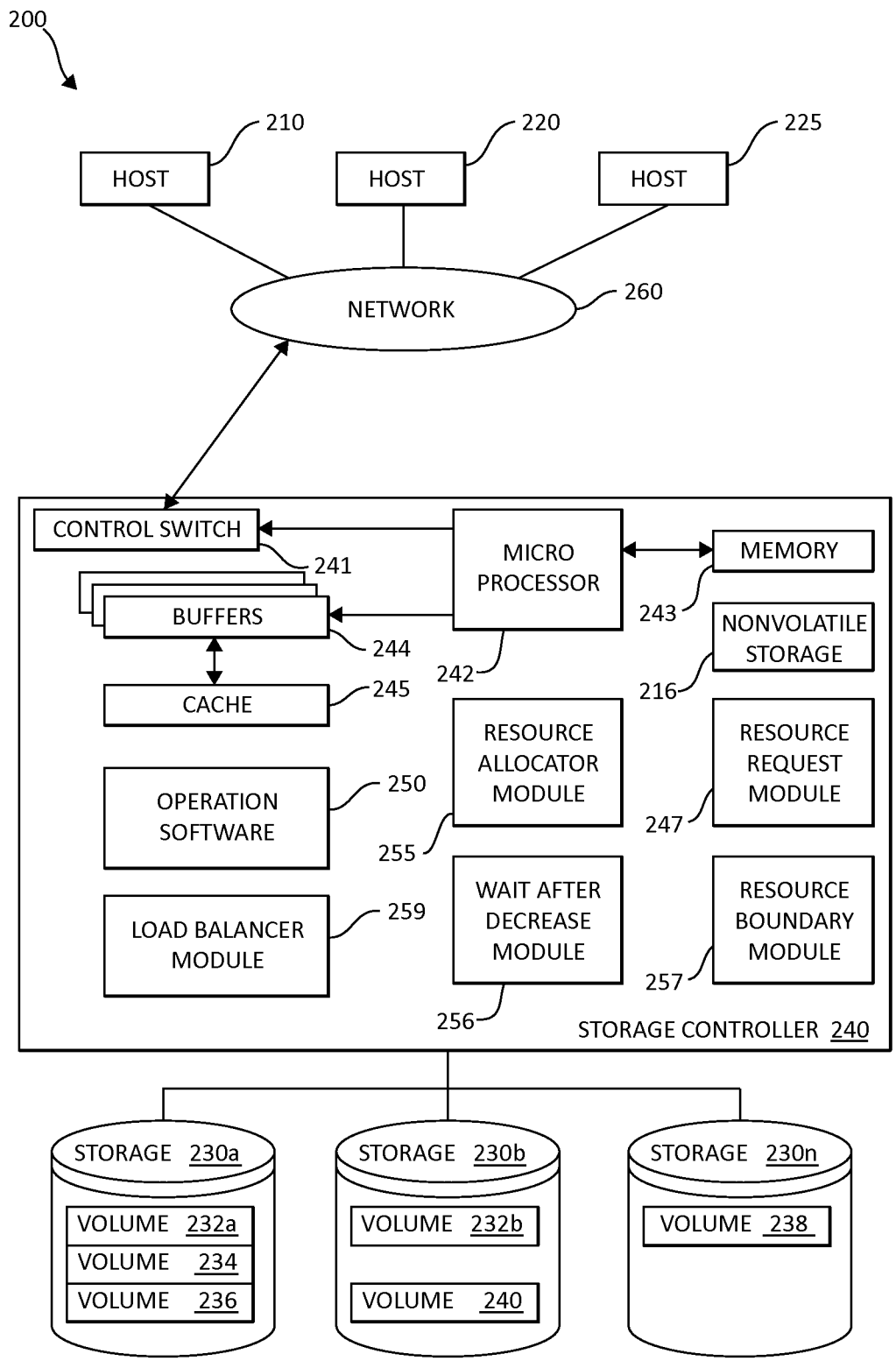
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. It should be noted that the mechanisms of the present invention describes any dual activity computing system, which may require resource allocation. In one exemplary embodiment, by way of example only, a storage sub-system or storage controller is described but is not intended to limit the scope of the present invention. Referring to FIG. 2, there are shown host computers 210, 220, 225, each acting as a central processing unit for performing data processing a part of a data storage system 200 for resource allocation of resources for dual activities systems. The hosts (physical or virtual devices), 210, 220, and 225 may be one or more new physical devices or logical devices to accomplish the purposes of the present invention in the data storage system 200. In one embodiment, by way of example only, a data storage system 200, as described herein, may be implemented as IBM® products (e.g., IBM® System Storage™ TS7650/TS7650G ProtecTIER Deduplication products). A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, in one exemplary embodiment, by way of example only, a storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, by way of example only, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention for resource allocation of resources for dual activities systems in a computer storage environment. In one embodiment, system memory 243 includes, is associated, or is in communication with the operation software 250 for resource allocation of resources for dual activities systems in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller may be accessible by microprocessor 242 and serves to provide additional support for operations and execution of the present invention as described in other figures. The NVS 216, may also referred to as a "persistent" cache, or "cache memory" and may be implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 may be less than or equal to the total capacity of cache 245.

Storage 230 may be physically comprised of one or more storage devices, such as storage arrays. A storage array may be a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 may be allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

In one embodiment, by way of example only, the storage controller 240 may include a resource allocator module 255, a wait after decrease (or may be referred to as waiting after decrease throughout the specification and drawings) module 256, a resource boundary module 257 (e.g., a resource threshold), and a resource request module 247, a load balancer module 259 to assist with resource allocation of resources for dual activities systems in a computing environment. The resource allocator module 255, the wait after decrease module 256, the resource boundary module 257, the resource request module 247 may each be adapted to include one or more feedback control modules (not shown) and/or be configured to be in communication with one or more feedback control modules (not shown). The resource allocator module 255, the wait after decrease module 256, the resource boundary module 257, the resource request module 247, and the load balancer module 259 may work in conjunction with each and every component of the storage controller 240, the hosts 210, 220, 225, and storage devices 230. Both the resource allocator module 255, the wait after decrease module 256, the resource boundary module 257, the resource request module 247, and the load balancer module 259 may be structurally one complete module working together and in conjunction with each other for resource allocation of resources for dual activities systems in a computing environment or may be individual modules, performing individual functions as designed and configured according to the mechanisms described below. If the resource allocator module 255, the wait after decrease module 256, the resource boundary module 257, the resource request module 247, and the load balancer module 259 are one module, a feedback control module (not shown) may be implemented together in the one complete module. The resource allocator module 255, the wait after decrease module 256, the resource boundary module 257, the resource request module 247, and the load balancer module 259 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240 data for control, cache 245 for temporarily storing (buffering) data, and buffers 244 for assisting the cache 245 to read and write data, a control switch 241 for controlling a protocol to control data transfer to or from the storage devices 230, resource allocator module 255, the wait after decrease module 256, the resource boundary module 257, and the resource request module 247 on which information may be set. Multiple buffers 244 may be implemented with the present invention to assist with the resource allocation of resources for a dual activity system in a computing environment.

In one embodiment, by way of example only, the host computers or one or more physical or virtual devices, 210, 220, 225 and the storage controller 240 are connected through a network adaptor (this could be a fiber channel) 260 as an interface i.e., via a switch called "Fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, resource allocator module 255, the wait after decrease module 256, the resource boundary module 257, the resource request module 247, and the load balancer module 259 are in communication with each other and may be separate or one individual component(s). Also, several, if not all of the components, such as the operation software 245 may be included with the memory 243 for resource allocation of resources for a dual activity system in a computing environment. Each of the components within the storage device may be linked together and may be in communication with each other for purposes suited to the present invention.

Figure 3:
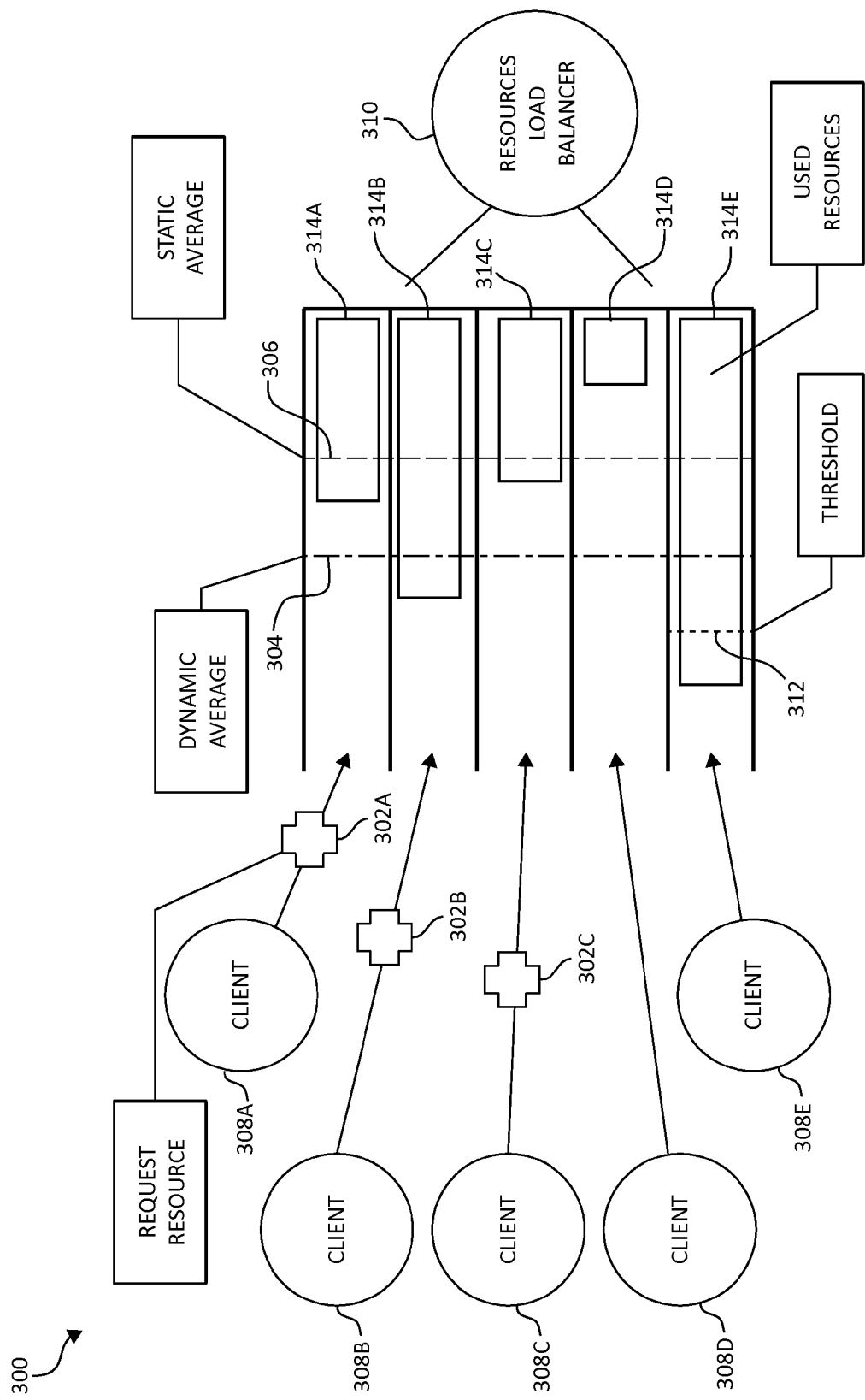
FIG. 3 illustrates an exemplary block diagram showing a computing environment with components for resource load balancing system in which aspects of the present invention may be realized.

As previously mentioned, the illustrated embodiments provide mechanisms for dynamically balancing resource requirement for a multiplicity of clients with unpredictable loads based on an average of resource usage by a processor device within a computing environment. FIG. 3 illustrates an exemplary block diagram 300 showing a computing environment with components for resource load balancing system. FIG. 3 illustrates a resource load balancer 310 that manages, controls, supervises, and/or assists in load balancing. Resource requests 302 (e.g., shown as 302A-C) are issued by one or more clients 308 (Client 1 302A, Client 2 308B, and Client 3 308C) are accepted only if the client's 308 current resource usage is lower than the client's 308 threshold. Requests 302 from a client 308 that has exceeded this boundary shall be rejected. The client's 308 threshold 312 is initially set to the static average 306, and the current resource usage of each client is set to zero. Thus, requests from a client 308 that has not yet exceeded its static average 306 are likely to be accepted. This behavior ensures that no client 308A-E will starve, even with low resources demand, hence satisfying the requirement (3), as described above, of avoiding starvation of a less-clients (i.e., even though a client demands lesser resources than other clients, it will receive resources and will not be starved).

The threshold 312 of each client 308 is decided dynamically, during runtime, by an FCA, which is affected by the total number of resources and by the number of clients 308. By taking those variables into account, the FCA makes sure that the amount of time it takes to deplete all the resources is constant, hence the behavior of the load balancer remains the same, no matter what the current TotalResources is, and satisfies requirement (6) of dynamically adjusting to changes in the total number of resources available for distribution.

The FCA is unaware of any pending resource requests 302. Every decision it takes is based solely on resource requests 302 already issued, and not on pending future requests, therefore satisfying requirement (4), operate in unpredictable load (i.e., unaware of pending resource requests).

The FCA needs to have the following properties. As long as the other client's 302 requests for resources are accepted, the FCA will allow the threshold 312 of the client 308 to increase. When a request 302 for a resource by a client 308 is rejected—the FCA will decrease the threshold 312 of all the clients 308 that allocated more resources than the dynamic average 304, which will be calculated according to the partial set of clients 308 (e.g., a set of 308A-E) who allocated more resources than the rejected client (e.g., one of the clients from 308A-E).

The FCA is unaware of the client's 308 weights and does not prioritize according to the weights. Therefore, the FCA does not use the actual current resource usage 314 (e.g., 314A-E for each client) of the clients nor the actual Total-Resources. Instead, the load balancer 310 normalizes those amounts according to each client's 308 normalization function and lets the FCA handle only normalized amounts. This way, when the FCA balances the clients 308 in an equal weights environment, it actually prioritizes clients 308 according to their weights. This behavior is aligned with requirement (1), which is to allocate resources according to predefined weights per client, for which clients with higher weights will be assigned a higher resource share than clients with lower weights (e.g., the greater the weight assigned to a client, the greater the resources share size a client will have).

When the number of total resources changes, the thresholds 312 of all the clients 308 are reset to the static average 306 and the FCA starts adjusting to the new situation in the same manner as before.

This utilization of feedback control enables clients 308 with high resource demand to gradually take precedence over clients 308 with very low resource demand, thus allowing the resource load balancer 310 to dynamically adjust to changes in resource requests 302 and to satisfy requirement (2), which is to adjust to changes in resource requests and dynamically assign more resources to a client with higher demand at the expense of a client that is not currently using its entire resource share. However, once the clients' 308 resource loads change, this behavior may cause other clients' 308 requests to be rejected, and the threshold 312 is rapidly adjusted to accommodate the change. It should be note that both the static average and the dynamic average are not dependent on the number of clients 308, and both are used to balance any given number of clients. Therefore, the load balancer can support multiple clients as required in requirement (5), which is to support multiple clients.

In one embodiment, as described in greater detail below, when a client requires a resource, it issues a resource request. The resource load balancer keeps track of the number of resources each client has (current resource usage, see FIG. 3 314) and the resource load balancer utilizes the current resource usage, together with the client's resource threshold, to determine whether to accept the resource request. If the request was accepted, once the client finishes using the resource it notifies the load balancer that the resource is now free—and the current resource usage of the client is updated accordingly.

As long as no resource request from a client is rejected, the threshold of each client keeps increasing additively, starting from the static average. The static average is calculated according to the formula depicted above in Equation 1, whereas LCM stands for least common multiple.

The threshold is updated according to Equation 2 (together forming the additive increase), below, whereas N is the number of clients. The increase rate is derived from the number of resources and the number of clients. This way, the amount of time it takes to deplete the available resources is not dependent on the TotalResources or the number of clients. The increase rate factor is a positive non-zero rational number that affects the rate of the Additive Increase. The threshold is calculated according to the formula as depicted the following equations:

IncreaseRate=(IncreaseRateFactor×TotalResources)/$N$

Threshold$_i$=Threshold$_i$+UpdateLatency$_i$×IncreaseRate  (2).

When a request from a client is rejected, the load balancer goes over all the clients, normalizes the current resource usage of each client and creates a partial set of clients with greater normalized current resource usage than the rejected client's normalized current resource usage. Let N be the number of clients, the Normalization function of each client is defined according to the formula depicted in Equation 3, described as a normalization function of client i:

$$\Omega_i(x) = \left( \frac{\left[\left(\prod_{j=0}^{N} weight_j\right) * \left(\sum_{k=0}^{N} weight_k\right)\right]}{(weight_i)} \right) * x. \quad (3)$$

Then, the dynamic average of the partial set of clients is calculated in the following manner. Let W be the set of weights of all the clients, $\overline{W}$ be the set of weights of the clients in the partial set and $\overline{TotalResoures}$ be the set of normalized current resource usage of the clients in the partial set, the dynamic average is calculated according to the formula in Equation 4:

$$(DynamicAverage) = \left( \frac{\left[(\overline{TotalResoures}) * \left(\sum_{weight_i \in \overline{W}} weight_i * LCM(W)\right)\right]}{\left(\sum_{weight_j \in \overline{W}} weight_j\right)} \right). \quad (4)$$

After the dynamic average was calculated, a multiplicative decrease is performed on the threshold of each client from the partial set that its normalized current resource usage is greater than the calculated dynamic average. Equation 5, below, describes how the multiplicative decrease is performed that is calculated as:

Threshold$_i$=DynamicAverage+($\Omega_i$(CurrentResource-Usage$_i$)−DynamicAverage)*DecreaseRateFactor  (5).

Figure 4:
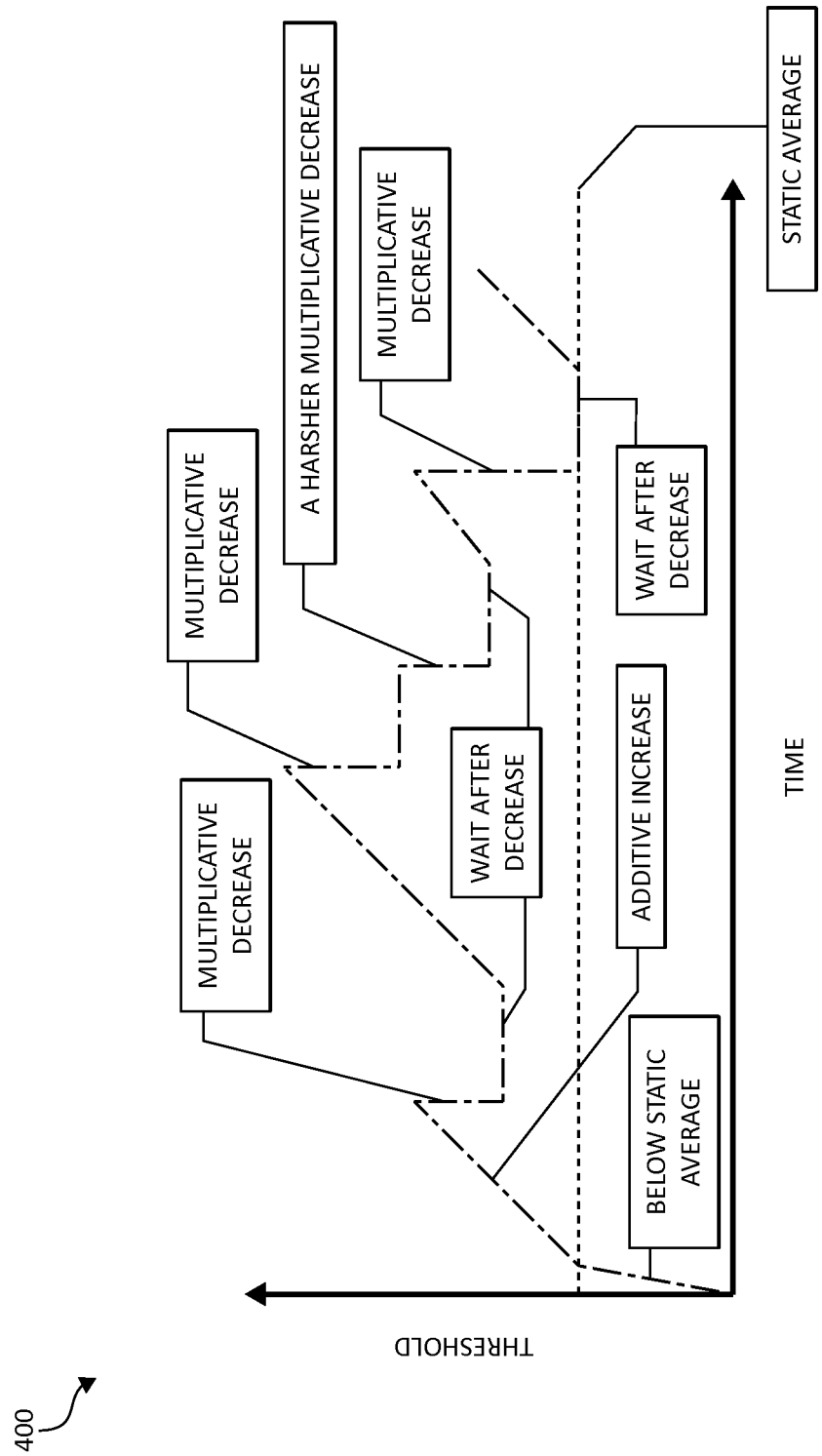
FIG. 4 is a snapshot illustrating a computing environment depicting the behavior of the resource threshold over time in which aspects of the present invention may be realized.

Turning now to FIG. 4, a snapshot illustrating a computing environment depicting the behavior of the resource threshold over time, is depicted. As illustrated in FIG. 4, once a multiplicative decrease takes place, the load balancer waits for the client's current resource usage to actually reach the new threshold in a state called "waiting after decrease". This prevents the decreased client from taking resources it should have released. As long as the client's current resource usage has not reached the new (decreased) threshold, the threshold does not additively increase. It can be multiplicatively decreased only if some other rejected client calculates an even lower threshold. Once the current resource usage of the client reaches the threshold, the waiting after decrease phase ends and the additive increase of the boundary is re-started.

In one embodiment, the procedure for processing an acquire resource request is as follows. When a resource request is issued, the resource load balancer determines whether the total number of resources allocated so far by all the clients has reached the total resources. If that is the case, there are no more resources to allocate (until some client releases some of its resources), thus the request is rejected and the resource load balancer rebalances (see FIG. 7). If there is a free resource to allocate, the resource load balancer calculates the client's current threshold (see Equation 2) and checks whether the current resource usage reaches the threshold. If so, the request is rejected,—otherwise, the resource load balancer increases the current resource usage of the client by one and accepts the request. Such a process is also demonstrated below in FIG. 5.

Figure 5:
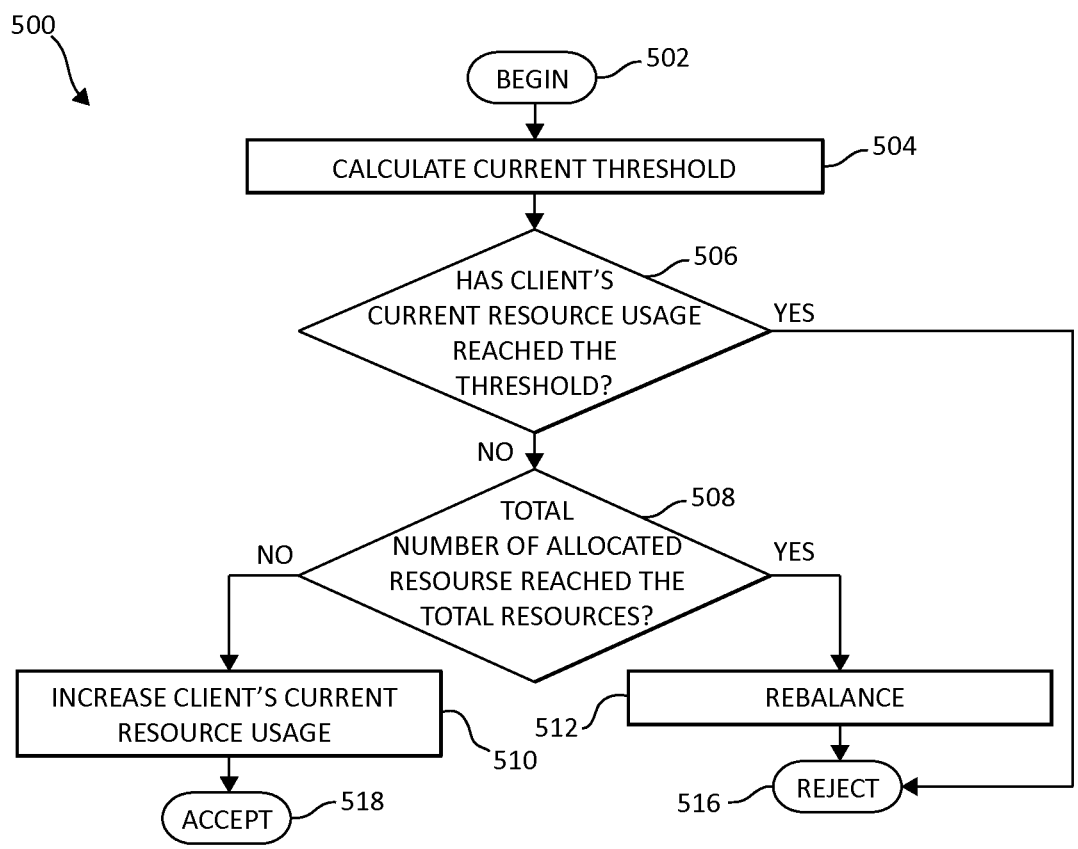
FIG. 5 is a flowchart illustrating an exemplary method for resource allocation of resources for a resource request in which aspects of the present invention may be realized.

FIG. 5 is a flowchart illustrating an exemplary method 500 for resource allocation of resources for a resource request in which aspects of the present invention may be realized. The method 500 begins (step 502) by calculating a current threshold (step 504). The method 500 determines if one and/or all clients current resource usage has reached the resource threshold (step 506). If yes, the method 500 then rejects the request (step 516). If no, the method 500 determines if the total number of allocated resources has reached the total resources (step 508). If yes, the method 500 rebalances the resource load (step 512). Then the method 500 then rejects the request (step 516). If no, the method 500 increases the client's current resource usage (step 510). The method 500 accepts the resource request (step 518).

Figure 6:
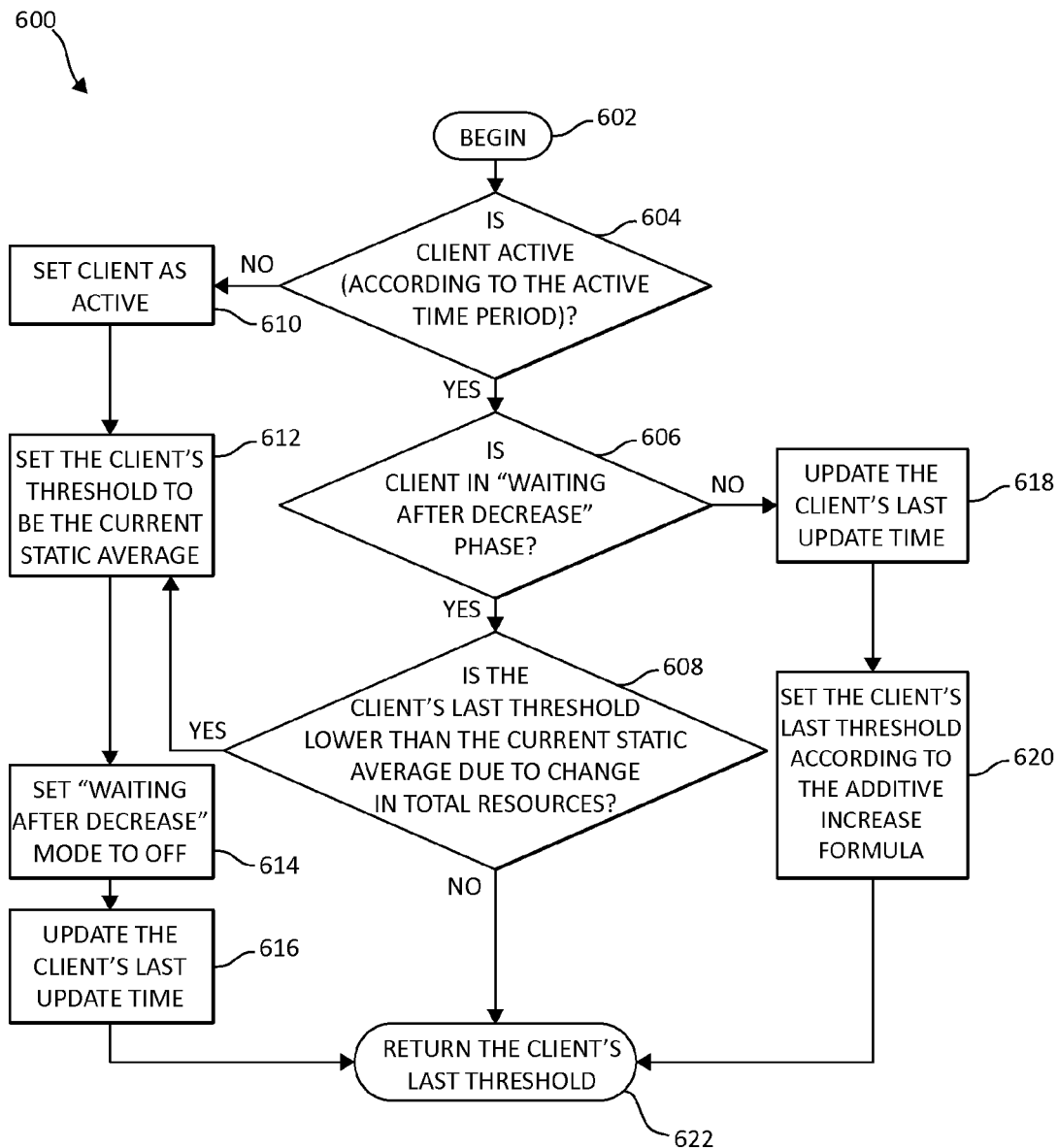
FIG. 6 is a flowchart illustrating an exemplary method for calculating a clients current resource threshold in which aspects of the present invention may be realized.

FIG. 6 is a flowchart illustrating an exemplary method 600 for calculating a client's current resource threshold. The method 600, begins (step 602) by first checking whether the client is active, by checking whether the time elapsed since the last update time of the client is greater than the active time period (step 604). If the client was inactive, the client turns active and all its state data (step 610), and sets the client's last threshold to be the current static average (step 612), sets the client's "waiting after decrease" mode to off (step 614), and updates the client's last update time (e.g., last update time is reset) (step 616).

Next, the load balancer checks whether the client is in a "waiting after decrease" phase (step 606). If the client is not in the "waiting after decrease" phase then the load balancer updates the client's last update time (step 618) and calculates and/or sets the client's new threshold according to the additive increase formula (see Equation 2) (step 620). At that point the method 600 returns the client's last threshold (step 622).

If the client is in the "waiting after decrease" phase, the load balancer checks whether the client's last threshold is lower than the current static average (step 608). The static average may change since the total resources is being used in order to calculate the static average and because the resource load balancer supports changing the total resources online (see requirement (6) as mentioned above. The client's last threshold is always returned. However, before the client's last threshold is returned, the method 600 needs to prevent the threshold from going under the static average by checking whether it gone below and if so the method 600 fixes the client's last threshold by performing (steps 612, 614, and 616) in order to prevent the threshold from going under the static average. If the client's last threshold is not lower than the current static average, the last threshold is returned (step 622). Otherwise, the load balancer turns off "waiting after decrease", updates last update time, and sets the new threshold to be static average (step 614).

In one embodiment, the present invention provides the procedure for rebalancing is as follows. First, the load balancer creates a partial set of clients, which contains any client with greater resource usage than the rejected client. Then the dynamic average of this set is calculated and the load balancer handles each client in the set in the following way. First it checks whether the client has a greater resource usage than the dynamic average. If not, the client keeps its current threshold. Next, the load balancer calculates a new threshold for the client using the multiplicative decrease formula (see Equation 5). Then, the load balancer checks whether the new threshold is lower than the last threshold. This is done since the previous punishment might have been more severe and the load balancer should avoid raising the threshold due to a later lighter punishment. If this is the case, the threshold is decreased to be the new threshold and the client's "wait after decrease" mode is turned on. When all the clients in the set were handled, the rebalance procedure finishes. Such a process is also demonstrated below in FIG. 7.

Figure 7:
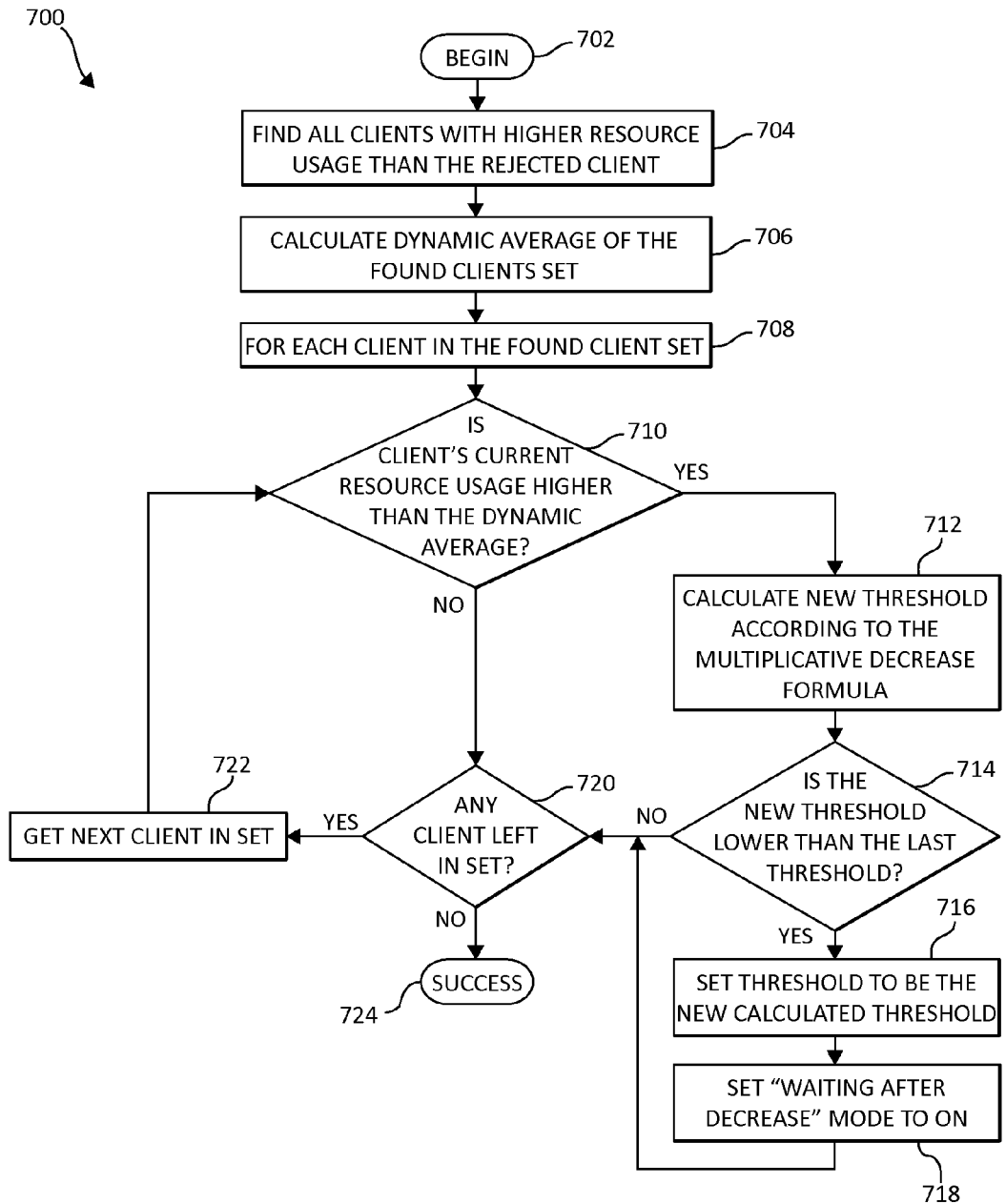
FIG. 7 is a flowchart illustrating an exemplary method for load rebalancing in which aspects of the present invention may be realized.

FIG. 7 is a flowchart illustrating an exemplary method 700 for load rebalancing. The method 700 begins (step 702) by finding all clients (e.g., identifies and/or creates a partial set of clients) with a higher resource usage than a client that has had a resource request rejected (step 704). The method 700 calculates a dynamic average of the partial set of clients (step 706). Next, for each client in the found set of clients (step 708), the method 700 determines if a client's current resource usage is higher than the dynamic average (step 710). If a client's current resource usage is not higher than the dynamic average, the method 700 determines if there are any clients left in the set (step 720). If yes, the method 700 calculates a new threshold according to the multiplicative decrease formula (step 712). The method 700 determines if the new threshold is lower than the last threshold (step 714). If yes, the method 700 sets the threshold to be the new calculated threshold (step 716) and then sets the "waiting after decrease" mode to "ON" (step 718). Returning to step 714, if the new threshold is not lower than the last threshold, the method 700 determines if there are any clients left in the set (step 720). If no, the method 700 reaches a success status (step 724). If there are more clients in the set, the method 700 retrieves and/or gets the next client in the set of clients (step 722) and returns to step 710.

In one embodiment, if the resource request is accepted, the client needs to notify the load balancer once it finishes using the resource. The procedure for processing a release resource request is as follows. First, the procedure decreases the client's current resource usage by one and checks whether the client is still in "waiting after decrease" phase. If it is not the case, the procedure finishes. Otherwise, the load balancer checks whether the client should still remain in "waiting after decrease" by checking whether the new resource usage of the client is still greater the last threshold. If so, the client stays in "waiting after decrease". If not, the load balancer disables the client's "waiting after decrease" phase. Such a process is also demonstrated below in FIG. 8.

Figure 8:
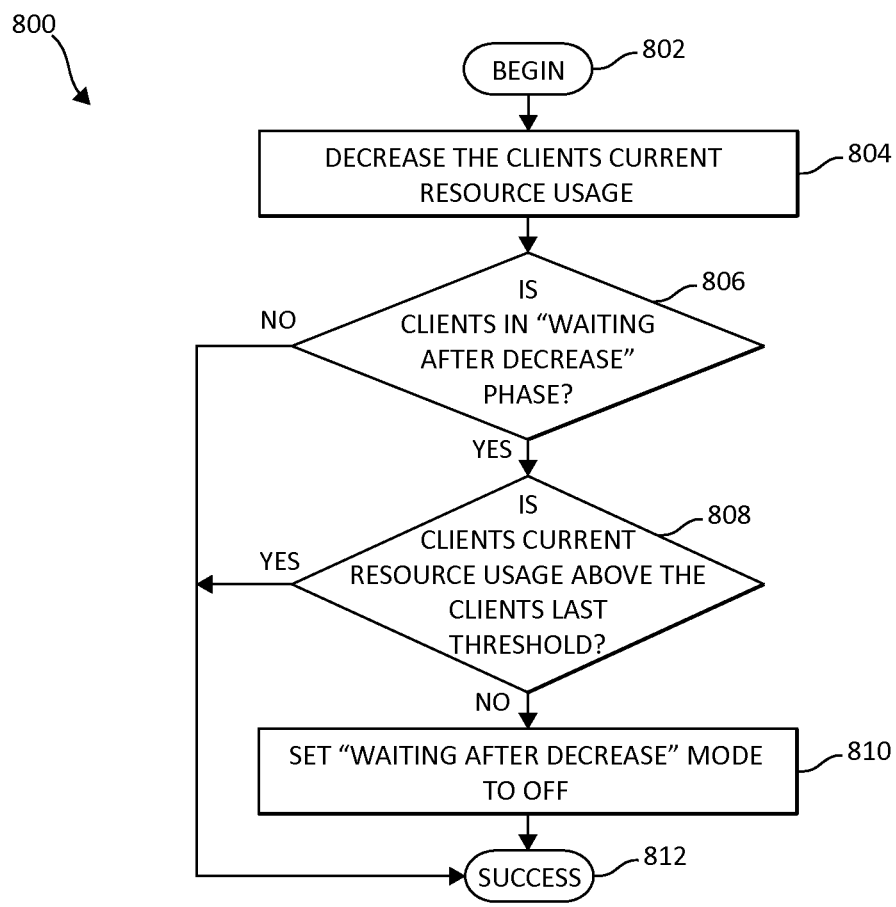
FIG. 8 is a flowchart illustrating an exemplary method for releasing a resource request in which aspects of the present invention may be realized.

FIG. 8 is a flowchart illustrating an exemplary method 800 for releasing a resource request. The method 800 begins (step 802) by decreasing the client's current resource usage (step 804). The method 800 determines if the client is in the "waiting after decrease" phase (step 806). If no, the method 800 reaches a success (step 812). If the client is in the "waiting after decrease" phase, the method 800 determines if the client's current resource usage is above the client's last threshold (e.g., last resource threshold) (step 808). If yes, the method moves to step 812. If no, the method 800 sets the "waiting after decrease" mode to "OFF" (step 810) and then moves to step 812.

Thus, as describe herein, the present invention provides a solution for dynamically balancing resources according to resource requirements for each of a multiplicity of clients with unpredictable loads based on a resource usage history by a processor device in a computing environment. In one embodiment, the present invention limits a resource usage of each of the plurality of clients by a resource threshold, increases the resource threshold of each of the multiplicity of clients increases over time, decreases the resource threshold of each of the multiplicity of clients upon a depletion a multiplicity of resource and a resource request of one of the multiplicity of clients is rejected, creates a subset of clients from the multiplicity of clients having the resource usage greater than the resource usage of the one of the multiplicity of clients whose resource request has been rejected, and/or computes a dynamic average of a normalized number of a multiplicity of resources from the subset of clients. The resource threshold is decreased of all clients from the subset of clients based on the dynamic average of the subset of client. Further acquisition of the plurality of resources is restricted from all of the clients from the subset of clients in order to bring the resource usage of each of the subset of clients under the resource threshold.

In one embodiment, by way of example only, the present invention accepts a resource request if a sum of a current resource usage of each the multiplicity of clients is lower than a total number of the multiplicity of resources, and rejects the resource request if the sum of a current resource usage of each the plurality of clients is greater than a total number of the plurality of resources. Subsequent to rejecting the resource request, the present invention nominalizes a current resource usage using a normalization function for each of the multiplicity of clients, and/or performs a multiplicative decrease on the resource threshold for each of the subset of clients from the multiplicity of clients.

In one embodiment, by way of example only, the present invention accepts the resource request by one of the multiplicity of clients if the resource usage of the one of the multiplicity of clients is lower than the resource threshold set for the one of the multiplicity of clients, and/or rejects the resource request by one of the multiplicity of clients if the resource usage of the one of the multiplicity of clients is one of equal to and greater than the resource threshold set for the one of the multiplicity of clients. Subsequent to rejecting the resource request, the present invention nominalizes a current resource usage using a normalization function for each of the multiplicity of clients, and/or performs a multiplicative decrease on the resource threshold for each of the subset of clients from the multiplicity of clients. In one embodiment, the present invention accepts the resource request by a client if the sum of current resource usage of all the clients is lower than the total resources and reject otherwise. Once a client's resource request has been rejected, the present invention frees some resources in order to accept the client's future resource request is by lowering the resource threshold of the client in the set of clients. This is done by rejecting the resource request by one of the multiplicity of clients if the resource usage of the one of the plurality of clients is one of equal to and greater than the resource threshold set for the one of the multiplicity of clients.

In one embodiment, by way of example only, the present invention allocates the multiplicity of resources according to predefined weights for each one of the multiplicity of clients. Those of the multiplicity of clients having a higher predefined weight are allocated a greater number of the multiplicity of resources. The present invention adjusts the allocation of the multiplicity of resources based on changes in resource requests by the multiplicity of clients by dynamically assigning more of the multiplicity of resources to at least one of the multiplicity of clients having a higher demand of the multiplicity of resources at an expense of one of the multiplicity of clients that is not currently using an entire allocated portion of the multiplicity of resources.

In one embodiment, by way of example only, the present invention initially sets the resource threshold for each of the multiplicity of clients to a static average and the resource usage for each of the multiplicity of clients to zero, and/or resets the resource threshold for each of the multiplicity of clients to the static average when a total number of the multiplicity of resources changes.

In one embodiment, by way of example only, the present invention increases the resource threshold for each the multiplicity of clients until the resource request for an alternative one of the at least one of the multiplicity of clients is rejected, and/or in response to the rejection of the resource request for the alternative one of the at least one of the multiplicity of clients, performs each one of 1) decreasing the resource threshold based on the dynamic average for each the subset of clients from the multiplicity of clients having more of the multiplicity of resources allocated than the one of the multiplicity of clients whose resource request has been rejected, and/or 2) commencing a wait after decrease mode until a current resource usage for each the subset of clients from the multiplicity of clients is one of less than and equal to the decreased resource threshold.

In one embodiment, by way of example only, the present invention terminates the wait after decrease mode when the current resource usage of each the subset of clients from the multiplicity of clients reaches the decreased resource boundary, restarts an additive increase operation of the resource threshold that was previously decreased, maintains the current resource usage and the resource boundary for each of the multiplicity of clients, and/or sends a notification when the multiplicity of clients is completed with an issued one of the multiplicity of resources and updating the current resource usage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for dynamically balancing a plurality of resources according to resource requirements for each of a plurality of clients with unpredictable loads based on a resource usage history by a processor device in a computing environment, the method comprising:
    limiting a resource usage of each of the plurality of clients by a resource threshold;
    increasing the resource threshold of each of the plurality of clients increases over time;
    decreasing the resource threshold of each of the plurality of clients upon a depletion a plurality of resource and a resource request of one of the plurality of clients is rejected;
    creating a subset of clients from the plurality of clients having the resource usage greater than the resource usage of the one of the plurality of clients whose resource request has been rejected;
    computing a dynamic average of a normalized number of a plurality of resources from the subset of clients, wherein:
        the resource threshold is decreased of all clients from the subset of clients based on the dynamic average of the subset of clients; and
        further acquisition of the plurality of resources is restricted from all of the clients from the subset of clients in order to bring the resource usage of each of the subset of clients under the resource threshold;
    increasing the resource threshold for each the plurality of clients until the resource request for an alternative one of the at least one of the plurality of clients is rejected; and
    in response to the rejection of the resource request for the alternative one of the at least one of the plurality of clients, performing each one of:
        decreasing the resource threshold based on the dynamic average for each the subset of clients from the plurality of clients having more of the plurality of resources allocated than the one of the plurality of clients whose resource request has been rejected, and
        commencing a wait after decrease mode until a current resource usage for each the subset of clients from the plurality of clients is one of less than and equal to the decreased resource threshold.

2. The method of claim 1, further including performing one of:
    accepting the resource request if a sum of a current resource usage of each the plurality of clients is lower than a total number of the plurality of resources, and
    rejecting the resource request if the sum of a current resource usage of each the plurality of clients is greater than a total number of the plurality of resources, wherein subsequent to rejecting the resource request performing one of:
        nominalizing a current resource usage using a normalization function for each of the plurality of clients, and
        performing a multiplicative decrease on the resource threshold for each of the subset of clients from the plurality of clients.

3. The method of claim 1, further including performing one of:
    allocating the plurality of resources according to predefined weights for each one of the plurality of clients, wherein those of the plurality of clients having a higher predefined weight are allocated a greater number of the plurality of resources, and
    adjusting the allocation of the plurality of resources based on changes in resource requests by the plurality of clients by dynamically assigning more of the plurality of resources to at least one of the plurality of clients having a higher demand of the plurality of resources at an expense of one of the plurality of clients that is not currently using an entire allocated portion of the plurality of resources.

4. The method of claim 1, further including performing one of:
    initially setting the resource threshold for each of the plurality of clients to a static average and the resource usage for each of the plurality of clients to zero, and
    resetting the resource threshold for each of the plurality of clients to the static average when a total number of the plurality of resources changes.

5. The method of claim 1, further including performing one of:
    terminating the wait after decrease mode when the current resource usage of one of the plurality of clients falls below the decreased resource boundary, and
    restarting an additive increase operation of the resource threshold that was previously decreased.

6. The method of claim 1, further including performing at least one of:
    maintaining the current resource usage and the resource boundary for each of the plurality of clients, and
    sending a notification when the plurality of clients is completed with an issued one of the plurality of resources and updating the current resource usage.

7. A system for dynamically balancing a plurality of resources according to resource requirements for each of a plurality of clients with unpredictable loads based on a resource usage history in a computing environment, comprising:
    a memory in communication with at least one processor device executing instructions to provide:
    a load balancer in the computing environment; and the at least one processor device, operable in the computing environment and controlling the load balancer, wherein the at least one processor device:
  limits a resource usage of each of the plurality of clients by a resource threshold,
  increases the resource threshold of each of the plurality of clients increases over time,
  decreases the resource threshold of each of the plurality of clients upon a depletion a plurality of resource and a resource request of one of the plurality of clients is rejected,
  creates a subset of clients from the plurality of clients having the resource usage greater than the resource usage of the one of the plurality of clients whose resource request has been rejected,
  computes a dynamic average of a normalized number of a plurality of resources from the subset of clients, wherein:
    the resource threshold is decreased of all clients from the subset of clients based on the dynamic average of the subset of client, and
    further acquisition of the plurality of resources is restricted from all of the clients from the subset of clients in order to bring the resource usage of each of the subset of clients under the resource threshold,
  increases the resource threshold for each the plurality of clients until the resource request for an alternative one of the at least one of the plurality of clients is rejected, and
  in response to the rejection of the resource request for the alternative one of the at least one of the plurality of clients, performs each one of:
    decreasing the resource threshold based on the dynamic average for each the subset of clients from the plurality of clients having more of the plurality of resources allocated than the one of the plurality of clients whose resource request has been rejected, and
    commencing a wait after decrease mode until a current resource usage for each the subset of clients from the plurality of clients is one of less than and equal to the decreased resource threshold.

8. The system of claim 7, wherein the at least one processor device performs one of:
  accepting the resource request if a sum of a current resource usage of each the plurality of clients is lower than a total number of the plurality of resources, and
  rejecting the resource request if the sum of a current resource usage of each the plurality of clients is greater than a total number of the plurality of resources, wherein subsequent to rejecting the resource request performing one of:
    nominalizing a current resource usage using a normalization function for each of the plurality of clients, and
    performing a multiplicative decrease on the resource threshold for each of the subset of clients from the plurality of clients.

9. The system of claim 7, wherein the at least one processor device performs one of:
  allocating the plurality of resources according to predefined weights for each one of the plurality of clients, wherein those of the plurality of clients having a higher predefined weight are allocated a greater number of the plurality of resources, and
  adjusting the allocation of the plurality of resources based on changes in resource requests by the plurality of clients by dynamically assigning more of the plurality of resources to at least one of the plurality of clients having a higher demand of the plurality of resources at an expense of one of the plurality of clients that is not currently using an entire allocated portion of the plurality of resources.

10. The system of claim 7, wherein the at least one processor device performs one of:
  initially setting the resource threshold for each of the plurality of clients to a static average and the resource usage for each of the plurality of clients to zero, and
  resetting the resource threshold for each of the plurality of clients to the static average when a total number of the plurality of resources changes.

11. The system of claim 7, wherein the at least one processor device performs one of:
  terminating the wait after decrease mode when the current resource usage of one of the plurality of clients falls below the decreased resource boundary, and
  restarting an additive increase operation of the resource threshold that was previously decreased.

12. The system of claim 7, wherein the at least one processor device performs at least one of:
  maintaining the current resource usage and the resource boundary for each of the plurality of clients, and
  sending a notification when the plurality of clients is completed with an issued one of the plurality of resources and updating the current resource usage.

13. A computer program product for dynamically balancing a plurality of resources according to resource requirements for each of a plurality of clients with unpredictable loads based on a resource usage history by a processor device, the computer program product comprising a non-transitory computer-readable storage medium having computer-readable program code portions stored therein, the computer-readable program code portions comprising:
  a first executable portion that limits a resource usage of each of the plurality of clients by a resource threshold;
  a second executable portion that increases the resource threshold of each of the plurality of clients increases over time;
  a third executable portion that decreases the resource threshold of each of the plurality of clients upon a depletion a plurality of resource and a resource request of one of the plurality of clients is rejected;
  a fourth executable portion that creates a subset of clients from the plurality of clients having the resource usage greater than the resource usage of the one of the plurality of clients whose resource request has been rejected;
  a fifth executable portion that computes a dynamic average of a normalized number of a plurality of resources from the subset of clients, wherein:
    the resource threshold is decreased of all clients from the subset of clients based on the dynamic average of the subset of client, and
    further acquisition of the plurality of resources is restricted from all of the clients from the subset of clients in order to bring the resource usage of each of the subset of clients under the resource threshold;
  a sixth executable portion that increases the resource threshold for each the plurality of clients until the resource request for an alternative one of the at least one of the plurality of clients is rejected; and a seventh executable portion that, in response to the rejection of the resource request for the alternative one of the at least one of the plurality of clients, performs each one of:
- decreasing the resource threshold based on the dynamic average for each the subset of clients from the plurality of clients having more of the plurality of resources allocated than the one of the plurality of clients whose resource request has been rejected, and
- commencing a wait after decrease mode until a current resource usage for each the subset of clients from the plurality of clients is one of less than and equal to the decreased resource threshold.

14. The computer program product of claim 13, further including an eighth executable portion that performs one of:
- accepting the resource request if a sum of a current resource usage of each the plurality of clients is lower than a total number of the plurality of resources, and
- rejecting the resource request if the sum of a current resource usage of each the plurality of clients is greater than a total number of the plurality of resources, wherein subsequent to rejecting the resource request performing one of:
  - nominalizing a current resource usage using a normalization function for each of the plurality of clients, and
  - performing a multiplicative decrease on the resource threshold for each of the subset of clients from the plurality of clients.

15. The computer program product of claim 13, further including an eighth executable portion that performs one of:
- allocating the plurality of resources according to predefined weights for each one of the plurality of clients, wherein those of the plurality of clients having a higher predefined weight are allocated a greater number of the plurality of resources, and
- adjusting the allocation of the plurality of resources based on changes in resource requests by the plurality of clients by dynamically assigning more of the plurality of resources to at least one of the plurality of clients having a higher demand of the plurality of resources at an expense of one of the plurality of clients that is not currently using an entire allocated portion of the plurality of resources.

16. The computer program product of claim 13, further including an eighth executable portion that performs one of:
- initially setting the resource threshold for each of the plurality of clients to a static average and the resource usage for each of the plurality of clients to zero, and
- resetting the resource threshold for each of the plurality of clients to the static average when a total number of the plurality of resources changes.

17. The computer program product of claim 13, further including an eighth executable portion that performs one of:
- terminating the wait after decrease mode when the current resource usage of one of the plurality of clients falls below the decreased resource boundary, and
- restarting an additive increase operation of the resource threshold that was previously decreased.

18. The computer program product of claim 13, further including an eighth executable portion that performs at least one of:
- maintaining the current resource usage and the resource boundary for each of the plurality of clients, and
- sending a notification when the plurality of clients is completed with an issued one of the plurality of resources and updating the current resource usage.

\* \* \* \* \*